F. J. MOSER.
REEL.
APPLICATION FILED MAR. 16, 1908.
923,559.
Patented June 1, 1909.
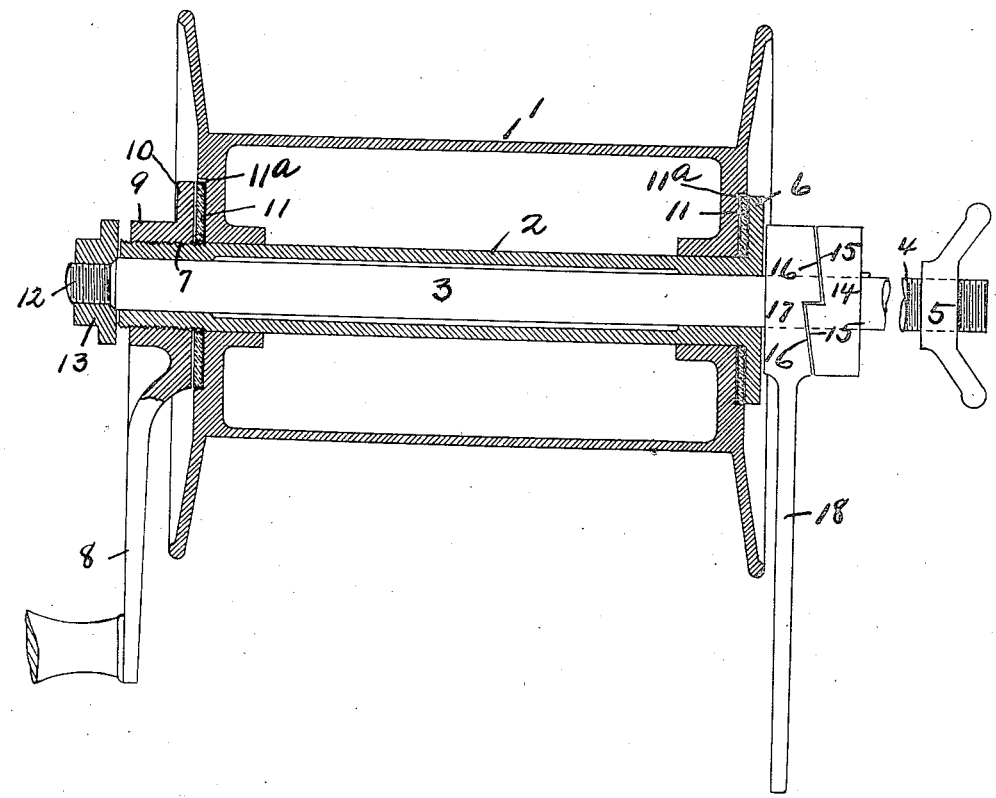
Witnesses
K. R. Kane
V. C. Heel
Inventor
Fred J. Moser
by R. C. [?]
Attorney

UNITED STATES PATENT OFFICE.

FRED JOSEPH MOSER, OF KANE, PENNSYLVANIA.

REEL.

No. 923,559.

Specification of Letters Patent.

Patented June 1, 1909.

Application filed March 16, 1908. Serial No. 421,564. REISSUED

*To all whom it may concern:*

Be it known that I, FRED J. MOSER, a citizen of the United States, residing at Kane, in the county of McKean and State of Pennsylvania, have invented new and useful Improvements in Reels, of which the following is a specification.

This invention relates to reels, and consists in certain improvements in the construction thereof as will be hereinafter fully described and pointed out in the claims.

The reel forming the subject matter of the invention is peculiarly adapted for handling measuring lines in deep wells, but may be useful for other purposes.

The invention is illustrated in the accompanying drawings; wherein is shown a central vertical section of the device.

1 marks the spool. 2 a sleeve or hollow shaft on which the spool is rotatively mounted, and 3 a shaft on which the sleeve is rotatively mounted. The shaft has the extension 4 at one end provided with a nut 5 by means of which it may be secured to any convenient support. The sleeve 2 is provided with the flange 6 at one end, and has the screw thread 7 at the opposite end. The crank 8 has the screw threaded hub 9 arranged to operate upon the screw thread 7. The hub is provided with the flange 10 similar in form to the flange 6. The washers 11 are arranged at each end of the spool in the recesses 11ª.

As the crank is screwed up on the sleeve 2 it clamps the spool between the flanges 6 and 10. If this clamping action is carried far enough the spool is locked with the crank, so that the spool may be rotated by the crank to wind a line upon it. The crank may be utilized also as a brake as the line is payed out by controlling the clamping action.

In order to make the turning of the crank on the sleeve positive it is desirable to lock the sleeve against turning with the crank at this time. The shaft 3 has the screw threaded end 12 on which is arranged the nut 13. A cam collar 14 having the cam surfaces 15—15 on its face is fixed on the shaft 3 at the opposite end of the spool. A cam collar 17 having the cam surfaces 16—16 arranged to oppose and coöperate with the cam surfaces 15—15 is journaled on the shaft 3. The lever 18 extends from this collar. The collar is formed axially by the cam surfaces, so that the sleeve 2 is clamped between the collar 17 and nut 13, thus securely locking it against rotation as the crank is turned to force it into engagement with the spool either for clamping it with the spool, or for utilizing it as a brake. When it is desired to turn the spool for winding the line, the collar 17 is released, so that the sleeve 2 is free to rotate with the spool and crank. As the line is payed out the sleeve is locked against rotation through the action of the collar 17, and the speed is controlled through the action of the crank. As it is screwed up the braking action of course increases, and as it is unscrewed it permits the spool to run more freely.

One of the important advantages of this construction is, that the crank does not rotate with the spool in paying out the line, but is then used as a "brake" to regulate the speed of the spool. Reels of ordinary construction having their cranks fixed to the spool which when revolving rapidly are thrown out of balance by the swing of the crank, and the motion then becomes jerky, the brake unsatisfactory and the reach of the crank and handle a source of danger which is obviated in this construction. With my construction the spool runs evenly, the screw threaded engagement of the crank forms a nice adjustment of the crank with relation to the spool, and the control of the brake is very sensitive and the danger of the swinging crank removed.

What I claim as new is:

1. In a reel, the combination of a spool; a crank; concentric mountings for the crank and spool; devices for holding the crank mounting from movement in either direction as the crank is turned; means for clamping the crank and spool together as the crank is turned relatively to its mounting in one direction, and for releasing the crank therefrom as the crank is turned in the opposite direction.

2. In a reel, the combination of a spool; a crank; concentric mountings for the crank and spool; axially moving clamping devices for holding the crank mounting as the crank is turned; means for clamping the crank and spool together as the crank is turned relatively to its mounting in one direction and to release the crank therefrom as the crank is turned in the opposite direction.

3. In a reel, the combination of a spool; a crank having a screw threaded hub; concentric mountings for the crank and spool, the crank mounting being screw threaded to cooperate with screw threaded crank hub; and devices for holding the crank mounting from movement in either direction as the crank is turned relatively to its mounting.

4. In a reel, the combination of a spool; a crank having a screw threaded hub; concentric mountings for the crank and spool, the crank mounting being screw threaded to cooperate with screw threaded crank hub; and axially moving clamping devices for holding the crank mounting as the crank is turned on its mounting.

5. In a reel the combination of a spool; a sleeve upon which the spool is rotatively mounted, said sleeve having a flange at one end and a screw thread at the opposite end; a crank having a screw threaded hub mounted on the screw threaded sleeve adapted to operate upon said screw to clamp the crank and spool together, or to brake the spool; a shaft on which the sleeve is mounted; and a clamp for locking the sleeve with the shaft.

6. In a reel, the combination of a spool; a sleeve upon which the spool is rotatively mounted, said sleeve having a flange at one end and a screw thread at the opposite end; a crank having a screw threaded hub mounted on the screw threaded sleeve adapted to operate upon said screw to clamp the crank and spool together, or to brake the spool; a shaft on which the sleeve is mounted; and an axially moving cam actuated clamp mounted on the shaft and adapted to clamp and hold the sleeve as the crank is turned thereon.

7. In a reel, the combination of a spool; the hollow sleeve on which the spool is relatively mounted having the flange 6 and screw thread 7; the crank 8 having a screw threaded hub and flange 10 adapted to operate on the thread 7; the shaft 3 on which the sleeve is mounted, said shaft having a shoulder 13 to receive the thrust of the sleeve 2; the cam faced collar 14 fixed on the shaft; the cam faced collar 17 rotatively mounted on the shaft; the lever 18 for operating the collar 17, said collar 17 being adapted to clamp the sleeve on the shaft as it is actuated.

8. In a reel, the combination of a spool; the hollow sleeve having the flange 6 and screw thread 7; the crank 8 having a screw threaded hub and flange 10 adapted to operate on the screw 7; the shaft 3 on which the sleeve is mounted, said shaft having a shoulder 13 to receive the thrust of the sleeve 2; the cam faced collar 14 fixed on the shaft; the cam faced collar 17 rotatively mounted on the shaft; the lever 18 for operating the collar 17, said collar 17 being adapted to clamp the sleeve on the shaft as it is actuated; and the washer 11 between the spool and flanges 10 and 6.

9. In a reel, the combination of a shaft; a spool mounted on the shaft; a crank; brake flanges; means for locking the brake flanges to the spool so they will revolve with the spool and for disengaging them therefrom; and means for locking the brake flanges to the shaft and for disengaging them therefrom.

10. In a reel, the combination of a stationary shaft; a sleeve mounted on the shaft; a spool mounted on the sleeve; means for locking and releasing the shaft from the sleeve; and means for driving the spool with the sleeve and for retarding its revolution thereon.

11. In a reel, the combination of a shaft; a hollow sleeve mounted on said shaft; means for locking said sleeve to said shaft, and disengaging it therefrom; a spool mounted on said hollow sleeve; a crank mounted on said hollow sleeve; and means on the crank for braking the spool.

12. In a reel, the combination of a shaft; a spool mounted thereon; a hollow sleeve liner mounted between the spool and the shaft; means for locking the hollow sleeve to the shaft so that the spool will revolve upon said sleeve, and for releasing the sleeve from the shaft; and means for locking the hollow sleeve to the spool so that the sleeve and spool will revolve on the shaft.

13. In a reel, the combination of a shaft; a hollow sleeve mounted thereon; a spool and crank mounted on said hollow sleeve; means for locking the hollow sleeve to the shaft and disengaging it therefrom; and means for locking the spool, hollow sleeve and crank together so they will revolve in unison upon the shaft.

14. In a reel, the combination of a shaft; a spool, hollow sleeve and crank mounted thereon; means for locking said sleeve to said shaft and disengaging it therefrom; means actuated by the crank for braking said spool while said hollow sleeve is locked to said shaft.

15. In a reel, the combination of a stationary shaft provided with means for locking one end of same to a bearing; a spool and crank mounted on the free end of said shaft; means for locking said crank to said spool so that both will revolve in unison upon said shaft; and means for releasing the crank from the spool to permit the spool to rotate independently of the shaft.

16. In a reel, the combination of a stationary shaft provided with means for locking one end of said shaft to a bearing; a spool, hollow sleeve and crank mounted on the free end of said shaft; means for locking said hollow sleeve to said shaft; and means for braking said spool with said crank while said hollow sleeve is locked to said shaft.

17. In a reel, the combination of a stationary shaft provided with means for locking one end of said shaft to a bearing; a spool mounted on the free end of said shaft; a crank mounted on said shaft; means for allowing said spool to revolve on said shaft independent of the crank; means for braking said spool with said crank; and means for locking said crank to said spool so that both will revolve in unison on said shaft.

18. In a reel, the combination of a stationary shaft provided with means for locking one end of said shaft to a bearing; a spool mounted on said shaft; a crank mounted on said shaft; means for locking said spool to said shaft; means for braking said spool with said crank; and means for actuating said spool with said crank.

19. In a reel, the combination of a shaft having means at one end for securing it to a support; a sleeve mounted on the shaft; a spool mounted on the sleeve; means for locking and releasing the shaft from the sleeve; and means for driving the spool with the sleeve and for retarding its revolution thereon.

In testimony whereof I have hereunto set my hand in the presence of two subscribing witnesses.

FRED JOSEPH MOSER.

Witnesses:
S. HIESH,
STELLA BECKER.